(12) United States Patent
Takizawa et al.

(10) Patent No.: US 10,989,082 B2
(45) Date of Patent: Apr. 27, 2021

(54) EXHAUST GAS PURIFICATION SYSTEM

(71) Applicant: MAZDA MOTOR CORPORATION, Hiroshima (JP)

(72) Inventors: Tomoya Takizawa, Hiroshima (JP); Koichiro Harada, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 16/625,472

(22) PCT Filed: Jun. 15, 2018

(86) PCT No.: PCT/JP2018/023029
§ 371 (c)(1),
(2) Date: Dec. 20, 2019

(87) PCT Pub. No.: WO2018/235752
PCT Pub. Date: Dec. 27, 2018

(65) Prior Publication Data
US 2020/0392881 A1    Dec. 17, 2020

(30) Foreign Application Priority Data

Jun. 23, 2017   (JP) .............................. JP2017-123666

(51) Int. Cl.
  *B01D 53/94*    (2006.01)
  *F01N 3/023*    (2006.01)
  (Continued)

(52) U.S. Cl.
  CPC .......... *F01N 3/023* (2013.01); *B01D 46/0063* (2013.01); *B01D 46/2418* (2013.01);
  (Continued)

(58) Field of Classification Search
  CPC ... F01N 3/023; F01N 3/2066; B01D 46/0063; B01D 46/2428; B01D 53/944; B01D 53/9477; B01D 35/0006
  (Continued)

(56) References Cited

U.S. PATENT DOCUMENTS 7,713,909 B2 *   5/2010   Mao ......................... B01J 23/10
                                                        502/304
2009/0084092 A1 *  4/2009   Miyoshi .................... F01N 3/10
                                                        60/299
(Continued)

FOREIGN PATENT DOCUMENTS

EP      1598104 A1    11/2005
EP      2392791 A1    12/2011
(Continued)

OTHER PUBLICATIONS

International Search Report issued in PCT/JP2018/023029; dated Aug. 14, 2018.

*Primary Examiner* — Tom P Duong
(74) *Attorney, Agent, or Firm* — Studebaker & Brackett PC

(57) ABSTRACT

An exhaust gas purifier is disposed in an exhaust gas passage of an engine, and includes: a DPF for capturing PM contained in exhaust gas; an SCR catalyst provided downstream of the DPF in a direction of flow of the exhaust gas, and for reducing $NO_x$ contained in the exhaust gas for purification in the presence of $NH_3$; an injection unit provided between the DPF and the SCR catalyst, and for supplying urea to the SCR catalyst so as to supply $NH_3$ to the SCR catalyst; and an AMOX provided downstream of the SCR catalyst in the direction of flow of the exhaust gas, and for removing $NH_3$ having passed through the SCR catalyst. The DPF does not contain Pt or Pd, and contains Rh. The AMOX contains Pt.

16 Claims, 2 Drawing Sheets

(51) Int. Cl.
*B01D 46/00* (2006.01)
*B01D 46/24* (2006.01)
*B01J 23/10* (2006.01)
*B01J 23/63* (2006.01)
*B01J 29/068* (2006.01)
*B01J 35/00* (2006.01)
*B01J 35/04* (2006.01)
*F01N 3/022* (2006.01)
*F01N 3/08* (2006.01)
*F01N 3/20* (2006.01)
*F01N 3/28* (2006.01)

(52) U.S. Cl.
CPC ....... *B01D 53/944* (2013.01); *B01D 53/9418* (2013.01); *B01D 53/9477* (2013.01); *B01J 23/10* (2013.01); *B01J 23/63* (2013.01); *B01J 29/068* (2013.01); *B01J 35/0006* (2013.01); *B01J 35/04* (2013.01); *F01N 3/022* (2013.01); *F01N 3/0842* (2013.01); *F01N 3/2066* (2013.01); *F01N 3/2839* (2013.01); *B01D 2255/1021* (2013.01); *B01D 2255/1025* (2013.01); *B01D 2255/2061* (2013.01); *B01D 2255/2065* (2013.01); *B01D 2255/2066* (2013.01); *B01D 2255/2068* (2013.01); *B01D 2255/20715* (2013.01); *B01D 2255/9155* (2013.01); *B01D 2279/30* (2013.01); *F01N 2330/30* (2013.01); *F01N 2370/02* (2013.01); *F01N 2610/02* (2013.01); *F01N 2610/1453* (2013.01)

(58) Field of Classification Search
USPC .................................................. 422/171, 177
See application file for complete search history.

(56) References Cited

U.S. PATENT DOCUMENTS

| | | | |
|---|---|---|---|
| 2012/0186238 A1* | 7/2012 | Akamine | B01D 53/9472 60/299 |
| 2013/0078160 A1 | 3/2013 | Yamashita et al. | |
| 2014/0050627 A1 | 2/2014 | Mende et al. | |
| 2014/0205508 A1* | 7/2014 | Baba | B01D 53/944 422/177 |
| 2014/0235433 A1* | 8/2014 | Matsumura | B01J 37/031 502/304 |
| 2014/0235434 A1* | 8/2014 | Matsumura | B01J 23/63 502/304 |
| 2015/0087503 A1* | 3/2015 | Kawabata | B01J 37/0248 502/303 |
| 2016/0067690 A1* | 3/2016 | Sato | B01D 53/94 502/73 |
| 2016/0222851 A1* | 8/2016 | Kawabata | B01J 35/0006 |
| 2016/0228853 A1* | 8/2016 | Matsumura | B01J 35/0066 |

FOREIGN PATENT DOCUMENTS

| | | |
|---|---|---|
| JP | 2005329318 A | 12/2005 |
| JP | 2006289211 A | 10/2006 |
| JP | 2013141650 A | 7/2013 |
| JP | 2014-100668 A | 6/2014 |
| JP | 201525435 A | 2/2015 |
| JP | 201679912 A | 5/2016 |
| JP | 5937067 B2 | 6/2016 |
| JP | 2016159194 A | 9/2016 |
| WO | 2010087005 A1 | 8/2010 |

* cited by examiner

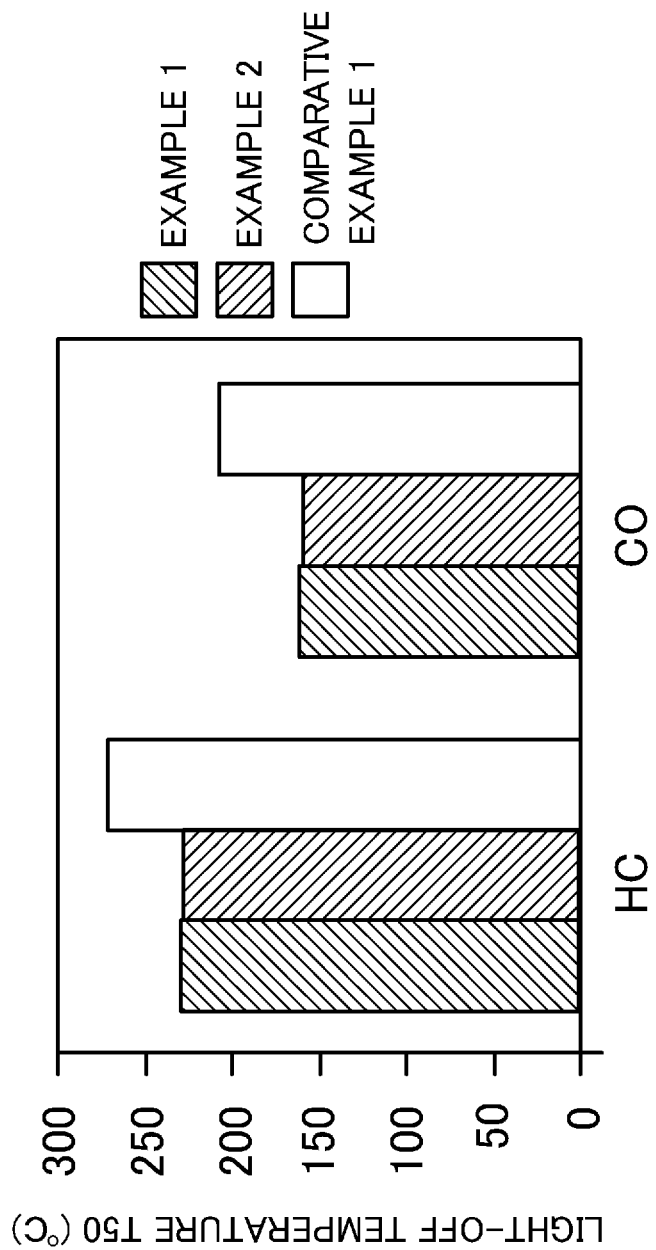

and thereby improve the NO$_x$ reduction purification performance of the SCR catalyst.

EXHAUST GAS PURIFICATION SYSTEM

TECHNICAL FIELD

The present disclosure relates to exhaust gas purification systems.

BACKGROUND ART

Diesel engines and lean-burn gasoline engines emit exhaust gases containing noxious substances such as hydrocarbons (HC), carbon monoxide (CO), NO$_x$ (nitrogen oxides), and particulates.

As a system for processing such hazardous substances, for example, PATENT DOCUMENT 1 describes a system in which exhaust gas is passed through an oxidation catalyst (DOC), catalyzed burning filter (CSF), reducing agent supply source, selective catalytic reduction (SCR) catalyst, and NH$_3$ oxidation catalyst in that order.

According to PATENT DOCUMENT 1, the CSF is a filter for capturing and burning off particulates contained in exhaust gas. The CSF includes Pt and Pd as noble metal components in order to improve particulate burning performance. In addition, Pt contained in the CSF can oxidize NO contained in exhaust gas to increase the NO$_2$ concentration and thereby improve the NO$_x$ reduction purification performance of the SCR catalyst.

CITATION LIST

Patent Document

PATENT DOCUMENT 1: Japanese Patent No. 5937067

SUMMARY OF THE INVENTION

Technical Problem

Incidentally, the filter is operated at high temperature in order to burn off particulates, which causes the problem that the catalyst activity of Pt and Pd supported as catalytic noble metals is reduced due to sintering, etc.

With the above in mind, the present disclosure has the problem of providing an exhaust gas purification system that can remove HC, CO, NO$_x$, and particulates from exhaust gas, and has superior particulate burning performance and HC and CO removal performance.

Solution to the Problem

An exhaust gas purification system disclosed herein is disposed in an exhaust gas passage of an engine, and includes: a particulate filter configured to capture particulates contained in exhaust gas; an SCR catalyst provided downstream of the particulate filter in a direction of flow of the exhaust gas, and configured to reduce NO$_x$ contained in the exhaust gas for purification in the presence of a reducing agent; an injection unit provided between the particulate filter and the SCR catalyst, and configured to supply the reducing agent or a precursor of the reducing agent to the SCR catalyst so as to supply the reducing agent to the SCR catalyst; and a reducing agent oxidation catalyst provided downstream of the SCR catalyst in the direction of flow of the exhaust gas, and configured to remove the reducing agent having passed through the SCR catalyst. The particulate filter does not contain Pt or Pd and contains Rh. The reducing agent oxidation catalyst contains Pt.

The temperature of the particulate filter is about 250° C. during normal operation, and the peak temperature of the particulate filter increases to about 850° C. during filter regeneration. Therefore, even in the case where Pt or Pd, which is a catalytic noble metal for accelerating burning of HC, CO, and particulates, is supported on the particulate filter, the catalytic performance may decrease due to sintering, etc.

With this configuration, the particulate filter contains Rh, which has high particulate burning performance. Therefore, an exhaust gas purification system including a particulate filter having superior particulate burning performance can be provided although the particulate filter does not contain Pt or Pd. The temperature of the reducing agent oxidation catalyst provided downstream of the SCR catalyst is about 650° C. even during filter regeneration. Therefore, by incorporating Pt into the reducing agent oxidation catalyst instead of the particulate filter, the reducing agent having passed through the SCR catalyst can be oxidized, and the decrease of catalytic performance due to sintering or the like of the catalytic noble metal can be reduced, and therefore, HC and CO contained in exhaust gas can be effectively removed.

In a preferable embodiment, the amount of Pt contained in the reducing agent oxidation catalyst is 0.1-6.0 g/L with respect to the entire volume of the particulate filter and the reducing agent oxidation catalyst.

With this configuration, by setting the amount of Pt contained in the reducing agent oxidation catalyst in the above range, HC and CO contained in exhaust gas can be effectively removed.

In a preferable embodiment, the particulate filter contains a Zr-based composite oxide which does not contain Ce, and a Ce-containing Zr-based composite oxide doped with Rh.

With this configuration, the particulate burning performance of the particulate filter can be improved.

In a preferable embodiment, an oxidation catalyst is disposed upstream of the particulate filter in the direction of flow of the exhaust gas.

With this configuration, the performance of removal of HC and CO contained in exhaust gas can be improved, and NO contained in exhaust gas is oxidized to NO$_2$, and therefore, PM burning in the particulate filter is accelerated.

Advantages of the Invention

As described above, according to the present disclosure, the particulate filter contains Rh, which has high particulate burning performance Therefore, an exhaust gas purification system including a particulate filter having superior particulate burning performance can be provided although the particulate filter does not contain Pt or Pd. In addition, by incorporating Pt into the reducing agent oxidation catalyst instead of the particulate filter, the reducing agent having passed through the SCR catalyst can be oxidized, and the decrease of catalytic performance due to sintering or the like of the catalytic noble metal can be reduced, and therefore, HC and CO contained in exhaust gas can be effectively removed.

BRIEF DESCRIPTION OF THE DRAWINGS

FIG. 3 is a graph diagram showing a light-off temperature (T50) of examples and a comparative example.

DESCRIPTION OF EMBODIMENTS

Embodiments of the present disclosure will now be described in detail with reference to the accompanying drawings. The preferred embodiments below are merely illustrative, and are in no way intended to limit the present disclosure, application, or uses.

First Embodiment

<Configuration of Exhaust Gas Purifier>

Figure 1:
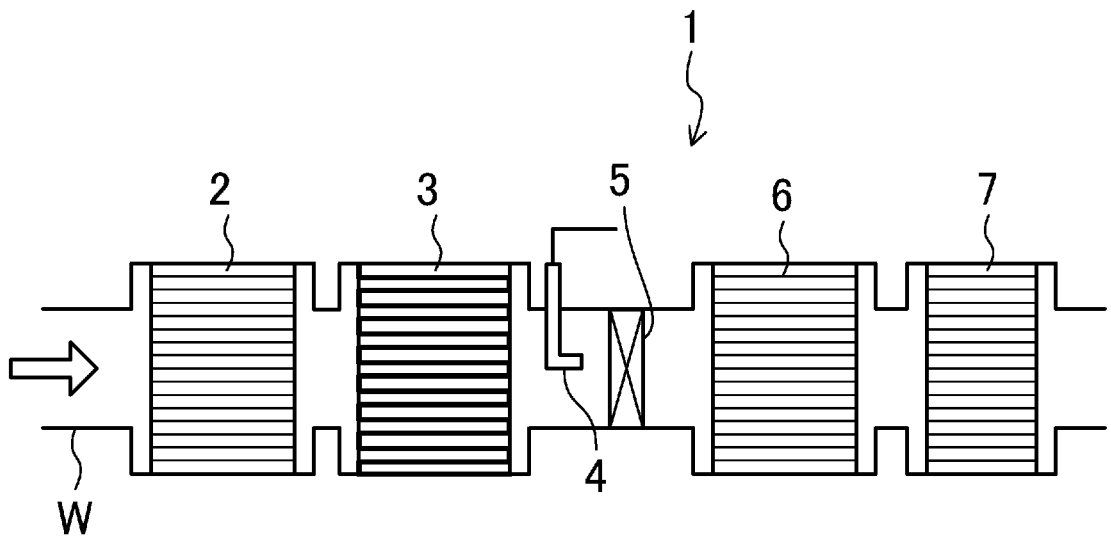
FIG. 1 is a diagram showing a configuration of an exhaust gas purifier for an engine.

FIG. 1 shows an exhaust gas purifier 1 (exhaust gas purification system) that can process HC, CO, $NO_x$, and particulate matter (hereinafter referred to as "PM") contained in exhaust gas emitted from a lean-burn engine (engine) (not shown). The engine of this example is a diesel engine. In an exhaust gas passage W for the engine, as the exhaust gas purifier 1, an oxidation catalyst (DOC) 2, a diesel particulate filter (DPF) 3 with a catalyst as a particulate filter, a reducing agent or reducing agent precursor injection unit 4, a mixer 5, an SCR catalyst 6, and a $NH_3$ oxidation catalyst (AMOX) 7 as a reducing agent oxidation catalyst are disposed in this order with the oxidation catalyst 2 located most upstream in the direction of flow of exhaust gas. As used herein, the terms "upstream" and "downstream" refer to the direction of flow of exhaust gas. The exhaust gas purifier 1 includes a tank for storing a reducing agent or reducing agent precursor, and various sensors. Based on signals from these sensors, the fuel injection control of the engine and the control of the injection unit 4 are carried out by an engine control unit (ECU).

—DOC—

The DOC 2 contains an HC-trapping material for trapping HC contained in exhaust gas, and a catalytic component for oxidizing HC trapped by the HC-trapping material, and HC, CO, and NO contained in exhaust gas. For example, the HC-trapping material is preferably zeolite, and the oxidation catalytic component is preferably a catalyst in which Pt and/or Pd are supported on a mixture of active alumina and an oxygen storage capacity (OSC) material. The OSC material may be, for example, a Ce-containing oxide whose heat resistance is improved by a transition metal, such as Zr, or a rare-earth metal, such as Nd.

The DOC 2, which contains the HC-trapping material, can trap HC in exhaust gas when the temperature of exhaust gas is low (catalyst is inactive), and can oxidize HC which is released from the HC-trapping material when the temperature of exhaust gas is high (catalyst is active) for purification, and therefore, can reduce the amount of HC that is emitted without being oxidized.

—DPF—

The DPF 3 is for capturing and removing PM contained in exhaust gas. In the DPF 3, a PM-burning catalyst for accelerating PM burning is supported on the body of the filter for capturing PM. The PM burning is performed during regeneration of the filter in order to burn off captured PM. The filter body is of the wall-flow type, i.e., has a honeycomb structure in which an exhaust gas inflow passage having a closed downstream end and an exhaust gas outflow passage having a closed upstream end are alternately arranged in parallel, and exhaust gas flowing into an exhaust gas inflow passage flows out through pores of a passage separation wall into an adjacent exhaust gas outflow passage. The filter body is formed of an inorganic porous material, such as cordierite, SiC, $Si_3N_4$, SiAlON, or $AlTiO_3$.

The PM-burning catalyst is preferably a mixture of a Zr-based composite oxide and a Rh-doped Ce-containing Zr-based composite oxide (Rh is located at crystal lattice points or between lattice points of the Ce-containing Zr-based composite oxide), and does not contain a catalytic noble metal having an oxidation catalytic function, such as Pt or Pd.

The Zr-based composite oxide contains Zr as a main component, does not contain Ce, and contains rare-earth metals other than Ce, e.g., Y, Nd, Pr, La, and Yb, preferably Y, Nd, and Pr, and particularly preferably Y or Nd, and Pr.

The Zr-based composite oxide can undergo an oxygen ion exchange reaction, and releases active oxygen without a change in valence of a metal ion. Because active oxygen is highly reactive, PM burning is accelerated without the presence of a catalytic noble metal, such as Pt or Pd. The contained amount of the Zr-based composite oxide is preferably 10-60 g per liter of the filter.

The Ce-containing Zr-based composite oxide contains Zr as a main component, contains Ce, and preferably further contains rare-earth metals other than Ce, e.g., Y, Nd, Pr, La, and Yb, more preferably Y, Nd, Pr, and La, and particularly preferably Nd.

The Ce-containing Zr-based composite oxide is an oxygen storage and release material, and has superior oxygen storage and release capacity based on a reversible reaction involving a change in valence of Ce. If such a Ce-containing Zr-based composite oxide is doped with Rh, the resultant composite oxide can accelerate a PM-burning reaction in which contact decreases in the course of burning.

The amount of Rh contained in the Rh-doped Ce-containing Zr-based composite oxide is preferably 0.01-1 mass %, more preferably 0.05-0.5 mass %, for improving PM-burning performance.

The mass ratio (the Zr-based composite oxide/the Rh-doped Ce-containing Zr-based composite oxide) of the Zr-based composite oxide and the Rh-doped Ce-containing Zr-based composite oxide is preferably 6/1-1/6, more preferably 4/1-1/4, for providing superior PM-burning performance.

The DOC 2, which is disposed upstream of the DPF 3, causes NO and oxygen ($O_2$) contained in exhaust gas to react with each other to generate $NO_2$. This $NO_2$ is supplied together with oxygen ($O_2$) contained in exhaust gas, as an oxidizing agent, to the DPF 3. Therefore, the burning of PM is accelerated. PM is reacted with oxygen or $NO_2$ and thereby converted into $CO_2$, which is emitted.

—Injection Unit and Mixer—

The injection unit 4, which is provided between the DPF 3 and the SCR catalyst 6, supplies a reducing agent or a reducing agent precursor to the SCR catalyst 6. Specifically, the injection unit 4 may be an injection valve that supplies a reducing agent or reducing agent precursor stored in the tank into the exhaust gas passage W between the DPF 3 and the mixer 5. The mixer 5 diffuses a reducing agent or a reducing agent precursor into exhaust gas contained in the exhaust gas passage W.

—SCR Catalyst—

The SCR catalyst 6 purifies exhaust gas by reducing $NO_x$ contained in the exhaust gas in the presence of a reducing agent. The SCR catalyst 6 may be a commonly used SCR catalyst. Note that in this example, the SCR catalyst 6 is a urea-SCR employing urea as a precursor of a $NH_3$, which serves as a reducing agent. Therefore, the tank stores urea water. The SCR catalyst 6 may be a catalytic component in which a catalytic metal for reducing $NO_R$ using $NH_3$ as a reducing agent is supported on zeolite for trapping $NH_3$. The catalytic metal for reducing $NO_R$ may be preferably Fe, Cu, Ti, V, W, or the like. The use of Pt or Pd, which easily oxidize $NH_3$ to $NO_R$, is not preferable.

The injection unit 4 injects urea water into the exhaust gas passage W, and the urea is subjected to pyrolysis and hydrolysis to generate $NH_3$ (reducing agent), which is adsorbed by the zeolite of the SCR catalyst 6. $NO_x$ (NO and $NO_2$) flowing into the SCR catalyst 6 is reduced to $N_2$ by $NH_3$ adsorbed by the zeolite or $NH_3$ flowing into the SCR catalyst 6 for purification, and the $N_2$ is emitted together with $H_2O$ generated during the reduction.

—AMOX—

The AMOX 7 traps and oxidizes (for purification) $NH_3$ and a derivative thereof that has passed (slipped) through the SCR catalyst without reacting with $NO_x$. The AMOX 7 is preferably configured so that a Pt-supporting zeolite in which Pt is supported on zeolite for trapping $NH_3$, and an OSC material, are supported on the cell wall of a honeycomb support. Note that Pt can accelerate oxidation of not only $NH_3$ but also HC and CO contained in exhaust gas, and thereby purify the exhaust gas. The OSC material contained in the AMOX 7 may be, for example, a Ce-containing oxide whose heat resistance is improved by a transition metal, such as Zr, or a rare-earth metal, such as Nd.

Here, the amount of Pt contained in the AMOX 7 is preferably 0.1-6.0 g/L, more preferably 0.2-1.0 g/L, with respect to the total volume of the DPF 3 and the AMOX 7 in order to effectively remove $NH_3$, and HC and CO contained in exhaust gas.

$NH_3$ and a derivative thereof that have passed through the SCR catalyst without reacting with $NO_x$ are trapped by the zeolite of the AMOX 7. Therefore, $NH_3$ and a derivative thereof are prevented from being emitted into the atmosphere. The $NH_3$ and a derivative thereof that are trapped by the zeolite are released when the temperature of the zeolite is high, and are oxidized by the Pt catalyst before being emitted out.

Note that during regeneration of the DPF 3, the temperature of the DPF 3 reaches about 850° C. while the temperature of the AMOX 7 reaches about 650° C. Therefore, if Pt is supported on the AMOX 7 instead of Pt or Pd being supported on the DPF 3, the sintering of the catalytic noble metal can be prevented or reduced, so that the decrease of catalytic performance can be prevented, and therefore HC and CO contained in exhaust gas can be effectively removed.

As described above, the exhaust gas purifier 1 of this embodiment, which includes the DPF 3, the injection unit 4, the SCR catalyst 6, and the AMOX 7, can remove HC, CO, $NO_x$ and PM from exhaust gas. In the exhaust gas purifier 1 of this embodiment, the DPF 3 contains Rh, which has high PM-burning performance, and therefore, has superior PM-burning performance without containing Pt or Pd. In addition, Pt is contained in the AMOX 7 instead of the DPF 3, and particularly, the contained amount of Pt is in the above range. Therefore, the oxidation of a reducing agent passing through the SCR catalyst 6 can be accelerated, and the decrease of catalytic performance due to sintering of the catalytic noble metal can be prevented or reduced, and therefore, the exhaust gas purifier 1 can have superior HC and CO removal performance.

Second Embodiment

Other embodiments of the present disclosure will now be described. In the description of these embodiments, the same parts as those of the first embodiment are denoted by the same reference characters and will not be described in detail.

In the first embodiment, the DOC 2 is provided upstream of the DPF 3. Alternatively, the DOC 2 may not be provided for some kinds of engines, for example. Note that it is desirable to provide the DOC 2 in order to improve the particulate burning performance of the DPF 3.

Alternatively, a $NO_x$ storage catalytic material (NSC) may be disposed instead of the DOC 2. Furthermore, a composite catalyst (NSC+DOC) of the DOC 2 and NSC may be disposed. A configuration in which NSC+DOC is disposed will now be described.

—NSC+DOC—

NSC+DOC may be disposed by, for example, the following technique: the DOC 2 described in the first embodiment is coated with a catalytic material which is a composite catalyst containing an NSC catalyst for temporarily trapping and reducing $NO_x$ in exhaust gas for purification and an oxidation catalyst (DOC) for oxidizing HC, CO, and NO in exhaust gas for purification.

The NSC catalyst contains: a catalytic component for oxidizing NO in exhaust gas; a $NO_x$-trapping material for trapping $NO_x$ contained in exhaust gas when the air-fuel ratio of the exhaust gas is lean, and releasing $NO_R$ when the air-fuel ratio of the exhaust gas is in the range from the theoretical to rich air-fuel ratios; and a catalytic component for reducing $NO_x$ trapped in the $NO_x$-trapping material. For example, the NO oxidation catalytic component is preferably a catalyst in which Pt is supported on a mixture of active alumina and a Ce-containing oxide as an OSC material, the $NO_x$-trapping material is preferably a compound of an alkaline-earth metal, such as Ba, and the $NO_x$-reducing catalytic component is preferably a catalyst in which Rh is contained in a mixture of active alumina and an OSC material (Ce-containing oxide).

An alkaline-earth metal salt of acetic acid is employed as a raw material for the $NO_x$-trapping material, is supported on a support, and is fired, resulting in an alkaline-earth metal salt of carbonic acid. Thus, this alkaline-earth metal salt of carbonic acid is the $NO_x$-trapping material.

The oxidation catalyst (DOC) may be one that is employed as the DOC 2 of the first embodiment.

NSC+DOC can impart a $NO_R$ removal function to an upstream portion of a post-processing system in which exhaust gas has a relatively high temperature. The $NO_R$ removal function, together with HC oxidation by DOC for purification, can reduce the amount of $NO_R$ emitted, particularly during start (cold start) of an engine.

Other Embodiments

The engine described in the above embodiments is a diesel engine. The present discloser is applicable to any lean-burn engines, including lean-burn gasoline engines, etc.

EXAMPLES

Next, examples which were specifically carried out will be described.

<PM-burning Performance of DPF>

Preparation of DPFs in Production Examples 1-3

DPFs of Production Examples 1-3 shown in Table 1 were prepared.

TABLE 1

| | | Configuration | Mass ratio | Amount of support PT (g/L) |
|---|---|---|---|---|
| Production Example 1 | ZrYPrO | $ZrO_2:Y_2O_3:Pr_2O_3 =$ 70:8:22 (mol %) | 3 | — |
| | Rh-doped CeZrNdO | $CeO_2:ZrO_2:Nd_2O_3 =$ 23:69:8 (mol %) Doped amount of Rh: 0.1 mass % | 2 | |
| Production Example 2 | ZrNdProO | $ZrO_2:Nd_2O_3:Pr_2O_3 =$ 70:12:18 (mol %) | 3 | — |
| | Rh-doped CeZrNdO | $CeO_2:ZrO_2:Nd_2O_3 =$ 23:69:8 (mol %) Doped amount of Rh: 0.1 mass % | 2 | |
| Production Example 3 | ZrYPrO | $ZrO_2:Y_2O_3:Pr_2O_3 =$ 70:8:22 (mol %) | 3 | 0.08 |
| | Rh-doped CeZrNdO | $CeO_2:ZrO_2:Nd_2O_3 =$ 23:69:8 (mol %) Doped amount of Rh: 0.1 mass % | 2 | |
| | La-containing alumina | $La_2O_3:Al_2O_3 = 4:96$ (mass %) | 1 | 0.17 |
| | Pure alumina | $Al_2O_3$ | 1 | |

In Production Examples 1-3, a ZrNdPr composite oxide (ZrNdPrO) and ZrYPr composite oxide (ZrYPrO) as the Zr-based composite oxide, and a Rh-doped CeZrNd composite oxide (Rh-doped CeZrNdO) as the Rh-doped Ce-containing Zr-based composite oxide, were prepared by the following preparation techniques. As the La-containing alumina and pure alumina in Production Example 3, respective commercially available powders were used.

—Preparation of ZrYPrO and ZrNdPrO—

Praseodymium nitrate hexahydrate, zirconyl oxynitrate solution, and yttrium nitrate or neodymium nitrate hexahydrate were dissolved in ion-exchanged water. The resultant nitrate solution was mixed and neutralized with an 8-fold dilution of 28-mass % ammonia water to obtain a coprecipitate. A dehydration operation of putting the solution containing the coprecipitate into a centrifuge and removing supernatant, and a water-washing operation of adding ion-exchanged water and stirring, were alternately repeated a required number of times. The coprecipitate after final dehydration was dried in the atmosphere at 150° C. for 24 hours, and thereafter, was pulverized using a ball mill. Thereafter, the pulverized coprecipitate was fired in the atmosphere at 500° C. for 2 hours to obtain ZrYPrO or ZrNdPrO.

—Preparation of Rh-doped CeZrNdO—

Cerium nitrate hexahydrate, zirconyl oxynitrate solution, neodymium nitrate hexahydrate, and rhodium nitrate solution were dissolved in ion-exchanged water. The resultant nitrate solution was mixed and neutralized with an 8-fold dilution of 28-mass % ammonia water to obtain a coprecipitate. A dehydration operation of putting the solution containing the coprecipitate into a centrifuge and removing supernatant, and a water-washing operation of adding ion-exchanged water and stirring, were alternately repeated a required number of times. The coprecipitate after final dehydration was dried in the atmosphere at 150° C. for 24 hours, and thereafter, was pulverized using a ball mill. Thereafter, the pulverized coprecipitate was fired in the atmosphere at 500° C. for 2 hours to obtain Rh-doped CeZrNdO.

Coating Filter Body with Catalyst Powders of Production Examples 1 and 2

Both of the DPFs included, as the filter body, a honeycomb-shaped filter of SiC (capacity: 25 mL, cell wall thickness: 16 mil, and number of cells: 178 cpsi).

ZrYPrO or ZrNdPrO, and Rh-doped CeZrNdO, were mixed together, and zirconia binder solution and ion-exchanged water were added to the mixed powder, following mixing, to obtain a slurry. The slurry was pulverized using a ball mill to a number-average particle size of about 200-400 nm (preferably about 300 nm). The filter body was coated with the resultant slurry. The slurry was dried in the atmosphere at 150° C., and was fired in the atmosphere at 500° C. for 2 hours, to obtain the DPF of Production Example 1 or 2.

Catalyst Powder of Production Example 3

ZrYPrO and Rh-doped CeZrNdO were mixed together, and ion-exchanged water was added to the resultant mixture to obtain a slurry, and the slurry was thoroughly stirred using a stirrer or the like. While continuing to stir the slurry, a predetermined amount of ethanolamine Pt (hexahydroxoplatinum(IV) acid ethanolamine solution) was dropped into the slurry, and the resultant mixture was thoroughly stirred. Thereafter, stirring was further continued while heating, so that water was completely evaporated. After the evaporation, the resultant dry solid was pulverized, and fired in the atmosphere at 500° C. for 2 hours. As a result, a catalyst powder was obtained in which Pt is supported on ZrYPrO and Rh-doped CeZrNdO.

The active alumina catalyst powder of Production Example 3 was prepared as follows. Specifically, a plurality of kinds of active alumina (pure alumina and La-containing alumina) were mixed together, and ion-exchanged water was added to the mixture to obtain a slurry, and the slurry was thoroughly stirred using a stirrer or the like. Next, while stirring the slurry, a predetermined amount of ethanolamine Pt was dropped into the slurry, and the resultant mixture was thoroughly stirred. Thereafter, stirring was further continued while heating, so that water was completely evaporated.

After the evaporation, the resultant dry solid was pulverized, and fired in the atmosphere at 500° C. for 2 hours. As a result, a catalyst powder was obtained in which Pt is supported on each type of alumina.

A catalyst powder in which Pt is supported on the above active alumina (pure alumina and La-containing alumina), and a catalyst powder in which Pt is supported on the above ZrYPrO and Rh-doped CeZrNdO, were mixed together, and zirconia binder solution and ion-exchanged water were added to the resultant mixed powder, followed by mixing, to obtain a slurry. The filter body was coated with the slurry, was dried in the atmosphere at 150° C., and thereafter, was fired in the atmosphere at 500° C. for 2 hours, to obtain the DPF of Production Example 3.

—Assessment of PM-burning Performance of DPFs—

Each of the DPFs of Production Examples 1-3 was stored, i.e., aged, in the atmosphere at a temperature of 800° C. for 24 hours. Thereafter, soot was deposited on each DPF by a procedure below, and the PM-burning performance of each DPF was investigated.

Initially, 5 g/L of carbon black was added to ion-exchanged water, and the mixture was stirred using a stirrer, so that the carbon black was thoroughly dispersed. An entrance end of the aged DPF was immersed in the resultant slurry, and the slurry was suctioned from an exit end of the DPF using an aspirator. Water that was not removed by the suction was removed by air blowing through an end surface of the filter which was immersed in the slurry. Thereafter, the DPF was held and dried at a temperature 150° C. for 2 hours.

Each DPF on which soot was thus deposited was attached to a fixed-floor model gas flow device. The temperature of $N_2$ gas at the entrance of the DPF was increased from room temperature to 580° C. while the $N_2$ gas was caused to flow through the DPF. After the temperature became stable at 580° C., the composition of the gas was changed to "7.5% of $O_2$+300 ppm of NO+$N_2$ (balance gas)" with the temperature maintained, and that gas was caused to flow through the DPF at a gas flow rate of 40 L/min. The concentrations of CO and $CO_2$ that were generated by burning carbon, in the gas, were measured at the exit of the filter in real time. The rate at which carbon was burnt (the amount of carbon burnet per unit time) was measured from these concentrations, every predetermined period of time, using the following calculation expression (1).

The rate (g/h) at which carbon is burnt={the gas flow rate (L/h)×[(CO+$CO_2$) concentration (ppm)/(1×10$^6$)]}×12 (g/mol)/22.4 (L/mol)　　(1)

Figure 2:
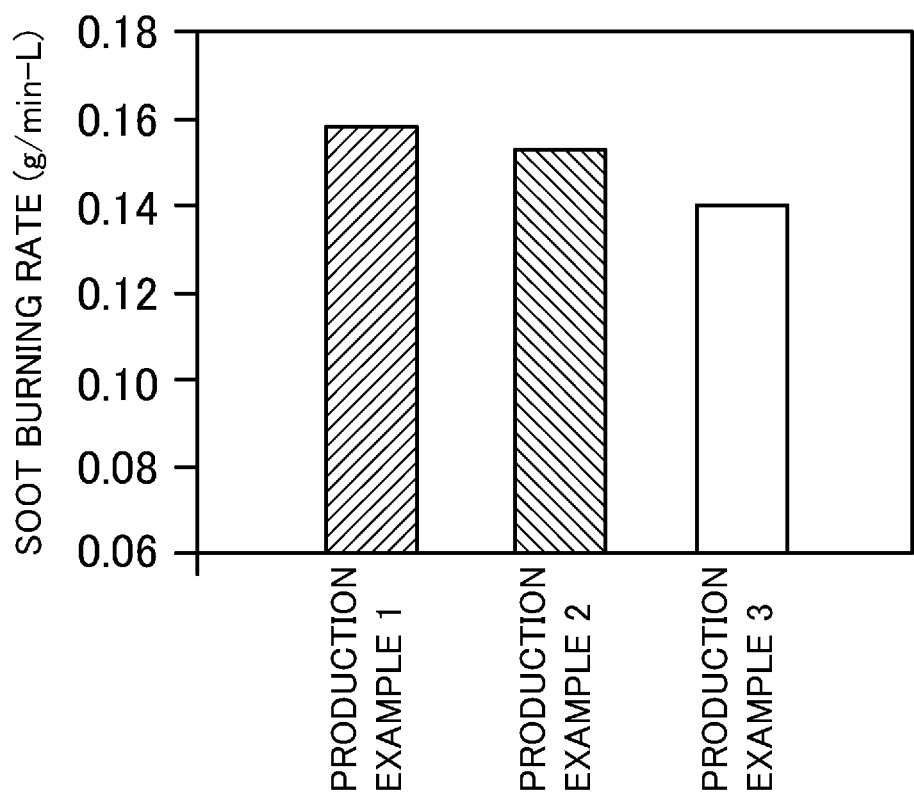
FIG. 2 is a graph diagram showing a carbon burning rate of each of DPFs of production examples.

The cumulative value of the amount of carbon burnt over time was also calculated. The rate at which soot was burnt (the amount of soot burnt per minute in one liter of the filter (g/min-L)) was calculated from the time it took for the soot burning ratio to reach 90%. The result is shown in FIG. 2.

It was found that the DPFs of Production Examples 1 and 2 prepared using a catalyst powder on which Pt or Pd is not supported had a high soot burning rate and superior PM-burning performance, compared to the DPF of Production Example 3 prepared using a catalyst powder on which Pt is supported.

<HC and CO Removal Performance of DPF+AMOX>

—Preparation of AMOX—

DPF+AMOX samples of Examples 1 and 2 and Comparative Example 1 shown in Table 2 were prepared. Note that for the sake of simplicity, DOC and SCR catalysts were not provided.

TABLE 2

| | | DPF [Catalyst volume: 25 mL] | | AMOX [Catalyst volume: 13 mL] |
|---|---|---|---|---|
| | Production Example | Amount of catalyst (g/L) | Amount of supported Pt (g/L) | Amount of supported Pt (g/L) |
| Example 1 | 1 | 28 | — | 1.0 |
| Example 2 | 2 | 28 | — | 1.0 |
| Comparative Example 1 | 3 | 28 | 0.25 | 0.50 |

As the catalyst support of an AMOX, a flow-through honeycomb support of cordierite (capacity: 13 mL, cell wall thickness: 4.5 mil, and number of cells: 400 cpsi) was used.

An AMOX was obtained by supporting, on the above honeycomb support, zeolite on which Pt is supported, and a CeZrNd composite oxide (CeZrNdO) as an OSC material, using a procedure described below.

—Preparation of Pt-supporting Zeolite Powder—

Ion-exchanged water was added to a commercially available zeolite powder to obtain a slurry, and the slurry was thoroughly stirred using a stirrer or the like. Next, while stirring the slurry, a predetermined amount of ethanolamine Pt was dropped into the slurry, and the resultant mixture was thoroughly stirred. Thereafter, stirring was further continued while heating, so that water was completely evaporated. After the evaporation, the resultant dry solid was pulverized, and fired in the atmosphere at 500° C. for 2 hours. As a result, a Pt-supported catalyst powder was obtained.

—Preparation of CeZrNdO—

Cerium nitrate hexahydrate, zirconyl oxynitrate solution, and neodymium nitrate hexahydrate were dissolved in ion-exchanged water. The resultant nitrate solution was mixed and neutralized with an 8-fold dilution of 28-mass % ammonia water to obtain a coprecipitate. A dehydration operation of putting the solution containing the coprecipitate into a centrifuge and removing supernatant, and a water-washing operation of adding ion-exchanged water and stirring, were alternately repeated a required number of times. The coprecipitate after final dehydration was dried in the atmosphere at 150° C. for 24 hours, and thereafter, was pulverized using a ball mill. Thereafter, the pulverized coprecipitate was fired in the atmosphere at 500° C. for 2 hours to obtain CeZrNdO.

—Coating of Filter Body—

The Pt-supporting zeolite powder and the CeZrNdO were mixed together, and zirconia binder solution and ion-exchanged water were added to the resultant mixed powder, followed by mixing, to obtain a slurry. The filter body was coated with the slurry, was dried in the atmosphere at 150° C., and thereafter, was fired in the atmosphere at 500° C. for 2 hours, to obtain an AMOX. Note that the amount of Pt supported on the AMOX was 1.0 g/L in Examples 1 and 2, and 0.50 g/L in Comparative Example 1. The amount of supported Pt with respect to the entire volume of the DPF and the AMOX was 0.34 g/L in all of Examples 1 and 2 and Comparative Example 1.

—HC and CO Removal Performance—

The DPFs of Production Examples 1-3 were subjected to a thermal treatment at 800° C. for 24 hours in a thermal-treatment-in-the-atmosphere furnace, as an aging treatment. The AMOX was subjected to a thermal treatment at 650° C. for 45 hours (2% $O_2$, 10% $H_2O$, balance $N_2$) in a thermal-treatment-in-ambient-gas furnace, as an aging treatment.

Thereafter, the DPF and the AMOX of any of Production Examples 1-3 shown in Table 2 were attached to a gas flow reaction device in this order with the DPF located upstream of the AMOX, and each light-off temperature T50 (° C.) involved with removal of HC and CO was measured. T50 (° C.) is a catalyst entrance gas temperature which is measured as follows: the temperature of model exhaust gas flowing into a catalyst is gradually increased from room temperature; changes in HC and CO concentrations of the gas flowing out of the catalyst are detected; and the temperature of exhaust gas at the entrance of the catalyst is measured when the removal ratio of each component reaches 50%.

A model gas having a gas composition "10% of $O_2$+1800 ppm of CO+50 ppm of NO+50 ppm of $NO_2$+100 ppm of $NH_3$+130 ppm of C—$C_2H_4$+50 ppm of C—$C_3H_6$+720 ppm of C–$C_8H_{18}$+10% of $H_2O$+$N_2$ (balance gas)" was caused to flow through the DPF and the AMOX at a gas flow rate of 40 L/min. An assessment temperature was increased from 100° C. to 600° C. at a temperature increase rate of 30° C./min to measure T50. The result is shown in FIG. 3. Note that as described above, in all of Examples 1 and 2 and Comparative Example 1, the amount of Pt supported on the DPF+AMOX sample was 0.34 g/L with respect to the total volume of the DPF and the AMOX.

It was found that the DPF+AMOX samples of Examples 1 and 2 in which Pt is supported only on the AMOX have a lower T50 with respect to both of HC and CO, and have higher HC and CO removal performance, than those of the DPF+AMOX sample of Comparative Example 1 in which Pt is supported on both of the DPF and the AMOX.

According to the result of FIG. 2, the DPF+AMOX samples of Examples 1 and 2 employing the DPFs of Production Examples 1 and 2 have higher PM-burning performance than that of the DPF+AMOX sample of Comparative Example 1 employing the DPF of Production Example 3.

Thus, it was found that the DPF+AMOX samples of Examples 1 and 2 have more excellent PM-burning performance and HC and CO removal performance than those of the DPF+AMOX sample of Comparative Example 1.

DESCRIPTION OF REFERENCE CHARACTERS

1 EXHAUST GAS PURIFIER (EXHAUST GAS PURIFICATION SYSTEM)
2 OXIDATION CATALYST, DOC
3 DIESEL PARTICULATE FILTER WITH CATALYST, DPF (PARTICULATE FILTER)
4 INJECTION UNIT
5 MIXER
6 SCR CATALYST
7 $NH_3$ OXIDATION CATALYST, AMOX (REDUCING AGENT OXIDATION CATALYST)
W EXHAUST GAS PASSAGE

The invention claimed is:

1. An exhaust gas purification system disposed in an exhaust gas passage of an engine, comprising:
a particulate filter configured to capture particulates contained in exhaust gas;
an SCR catalyst provided downstream of the particulate filter in a direction of flow of the exhaust gas, and configured to reduce NOx contained in the exhaust gas for purification in the presence of a reducing agent;
an injection unit provided between the particulate filter and the SCR catalyst, and configured to supply the reducing agent or a precursor of the reducing agent to the SCR catalyst so as to supply the reducing agent to the SCR catalyst; and
a reducing agent oxidation catalyst provided downstream of the SCR catalyst in the direction of flow of the exhaust gas, and configured to remove the reducing agent having passed through the SCR catalyst,
wherein
the particulate filter contains a Zr-based composite oxide which does not contain a catalytic noble metal or Ce, and a Rh-doped Ce-containing Zr-based composite oxide, and does not contain Pt or Pd as a catalytic noble metal, and
the reducing agent oxidation catalyst contains Pt.

2. The exhaust gas purification system of claim 1, wherein
the amount of Pt contained in the reducing agent oxidation catalyst is 0.1-6.0 g/L with respect to the entire volume of the particulate filter and the reducing agent oxidation catalyst.

3. The exhaust gas purification system of claim 2, wherein
the reducing agent oxidation catalyst contains a Ce-containing oxide.

4. The exhaust gas purification system of claim 2, wherein
an oxidation catalyst is disposed upstream of the particulate filter in the direction of flow of the exhaust gas.

5. The exhaust gas purification system of claim 2, wherein
the particulate filter includes
a wall-flow filter body having a honeycomb structure in which an exhaust gas inflow passage having a closed downstream end and an exhaust gas outflow passage having a closed upstream end are alternately arranged in parallel, and exhaust gas flowing into an exhaust gas inflow passage flows out through pores of a passage separation wall into an adjacent exhaust gas outflow passage, and
a coating formed on the filter body, and containing the Zr-based composite oxide and the Rh-doped Ce-containing Zr-based composite oxide,
the SCR catalyst does not contain Pt or Pd,
the reducing agent oxidation catalyst includes a flow-through honeycomb support and a Pt-supported zeolite supported on the honeycomb support, and
a temperature that the particulate filter reaches during regeneration of the particulate filter is 850° C., and a temperature that the reducing agent oxidation catalyst reaches during regeneration of the particulate filter is 650° C.

6. The exhaust gas purification system of claim 2, wherein
the amount of Rh contained in the Rh-doped Ce-containing Zr-based composite oxide is 0.01-1 mass %.

7. The exhaust gas purification system of claim 1, wherein
the reducing agent oxidation catalyst contains a Ce-containing oxide.

8. The exhaust gas purification system of claim 7, wherein
an oxidation catalyst is disposed upstream of the particulate filter in the direction of flow of the exhaust gas.

9. The exhaust gas purification system of claim 7, wherein
the particulate filter includes a wall-flow filter body having a honeycomb structure in which an exhaust gas inflow passage having a closed downstream end and an exhaust gas outflow passage having a closed upstream end are alternately arranged in parallel, and exhaust gas flowing into an exhaust gas inflow passage flows out through pores of a passage separation wall into an adjacent exhaust gas outflow passage, and a coating formed on the filter body, and containing the Zr-based composite oxide and the Rh-doped Ce-containing Zr-based composite oxide, the SCR catalyst does not contain Pt or Pd, the reducing agent oxidation catalyst includes a flow-through honeycomb support and a Pt-supported zeolite supported on the honeycomb support, and a temperature that the particulate filter reaches during regeneration of the particulate filter is 850° C., and a temperature that the reducing agent oxidation catalyst reaches during regeneration of the particulate filter is 650° C.

10. The exhaust gas purification system of claim 7, wherein the amount of Rh contained in the Rh-doped Ce-containing Zr-based composite oxide is 0.01-1 mass %.

11. The exhaust gas purification system of claim 1, wherein an oxidation catalyst is disposed upstream of the particulate filter in the direction of flow of the exhaust gas.

12. The exhaust gas purification system of claim 11, wherein the particulate filter includes a wall-flow filter body having a honeycomb structure in which an exhaust gas inflow passage having a closed downstream end and an exhaust gas outflow passage having a closed upstream end are alternately arranged in parallel, and exhaust gas flowing into an exhaust gas inflow passage flows out through pores of a passage separation wall into an adjacent exhaust gas outflow passage, and a coating formed on the filter body, and containing the Zr-based composite oxide and the Rh-doped Ce-containing Zr-based composite oxide, the SCR catalyst does not contain Pt or Pd, the reducing agent oxidation catalyst includes a flow-through honeycomb support and a Pt-supported zeolite supported on the honeycomb support, and a temperature that the particulate filter reaches during regeneration of the particulate filter is 850° C., and a temperature that the reducing agent oxidation catalyst reaches during regeneration of the particulate filter is 650° C.

13. The exhaust gas purification system of claim 11, wherein the amount of Rh contained in the Rh-doped Ce-containing Zr-based composite oxide is 0.01-1 mass %.

14. The exhaust gas purification system of claim 1, wherein the particulate filter includes a wall-flow filter body having a honeycomb structure in which an exhaust gas inflow passage having a closed downstream end and an exhaust gas outflow passage having a closed upstream end are alternately arranged in parallel, and exhaust gas flowing into an exhaust gas inflow passage flows out through pores of a passage separation wall into an adjacent exhaust gas outflow passage, and a coating formed on the filter body, and containing the Zr-based composite oxide and the Rh-doped Ce-containing Zr-based composite oxide, the SCR catalyst does not contain Pt or Pd, the reducing agent oxidation catalyst includes a flow-through honeycomb support and a Pt-supported zeolite supported on the honeycomb support, and a temperature that the particulate filter reaches during regeneration of the particulate filter is 850° C., and a temperature that the reducing agent oxidation catalyst reaches during regeneration of the particulate filter is 650° C.

15. The exhaust gas purification system of claim 14, wherein the amount of Rh contained in the Rh-doped Ce-containing Zr-based composite oxide is 0.01-1 mass %.

16. The exhaust gas purification system of claim 1, wherein the amount of Rh contained in the Rh-doped Ce-containing Zr-based composite oxide is 0.01-1 mass %.

\* \* \* \* \*